US012699956B2

(12) United States Patent
Austin

(10) Patent No.: US 12,699,956 B2
(45) Date of Patent: Aug. 4, 2026

(54) SYSTEMS AND METHODS FOR ITEM TRACKING DURING LOGISTICS OPERATIONS

(71) Applicant: ZEBRA TECHNOLOGIES CORPORATION, Lincolnshire, IL (US)

(72) Inventor: Timothy B. Austin, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 465 days.

(21) Appl. No.: 17/967,576

(22) Filed: Oct. 17, 2022

(65) Prior Publication Data

US 2024/0127169 A1 Apr. 18, 2024

(51) Int. Cl.
*G06Q 10/087* (2023.01)
*G06F 21/44* (2013.01)

(52) U.S. Cl.
CPC ........... *G06Q 10/087* (2013.01); *G06F 21/44* (2013.01)

(58) Field of Classification Search
CPC .. G06Q 10/087; G06Q 10/08; G06Q 10/0833; G06Q 10/083; G06K 7/10198; G06K 7/10207; G06K 7/10217; G06K 7/10227; H04W 4/80; H04W 4/025; H04W 4/029; H04W 4/14; H04W 12/06; H04W 4/38
See application file for complete search history.

(56) References Cited

U.S. PATENT DOCUMENTS

| 8,878,649 B2 * | 11/2014 | Wilkinson ......... G06K 7/10138 |
| | | 340/10.5 |
| 2014/0209676 A1 * | 7/2014 | Reynolds ................ B60R 99/00 |
| | | 235/385 |
| 2021/0268776 A1 * | 9/2021 | Thangamani ......... B60W 50/14 |
| 2023/0025103 A1 * | 1/2023 | Volkerink ............... H04W 4/33 |

* cited by examiner

*Primary Examiner* — Florian M Zeender
*Assistant Examiner* — Vanessa Deligi

(57) ABSTRACT

Systems and methods for item tracking are disclosed herein. The method determines at least one of first and second states of a container based on first data received from a first sensor associated with the container. Responsive to determining the container first state, the method modifies a communication protocol of a first device of the container, receives, by the first device, first information of at least one item associated with a first element, and determines the at least one item associated with the first element is positioned in the container based on the first information. Responsive to determining the container second state, the method identifies a first location of the container and modifies at least one of the communication protocol of the first device and a communication protocol of a second device of the container based on whether the second device receives second information of the first location associated with a second element.

16 Claims, 7 Drawing Sheets

300

350

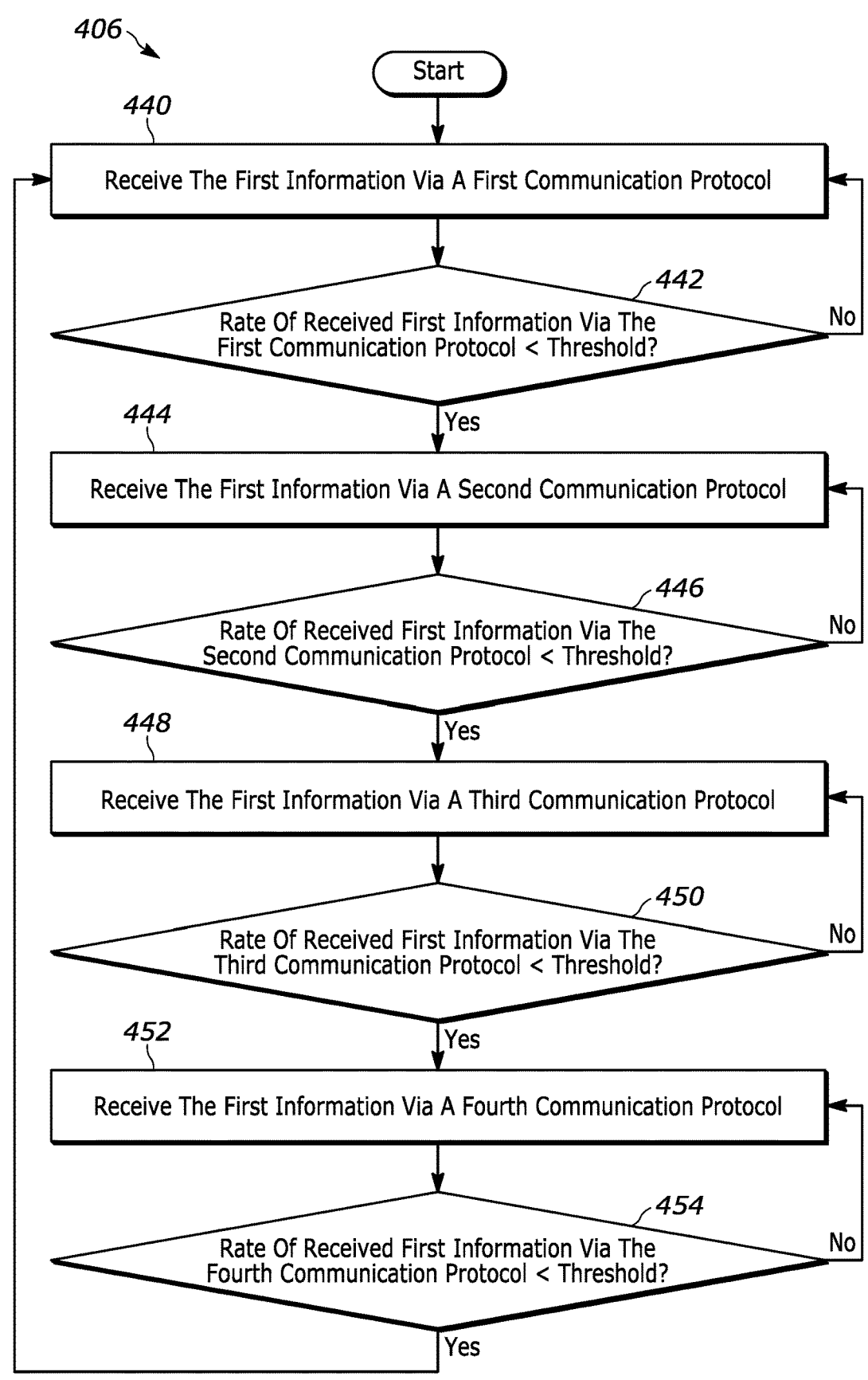

*406*

*440*

Start

Receive The First Information Via A First Communication Protocol

*442*

Rate Of Received First Information Via The First Communication Protocol < Threshold?    No Yes

*444*

Receive The First Information Via A Second Communication Protocol

*446*

Rate Of Received First Information Via The Second Communication Protocol < Threshold?    No Yes

*448*

Receive The First Information Via A Third Communication Protocol

*450*

Rate Of Received First Information Via The Third Communication Protocol < Threshold?    No Yes

*452*

Receive The First Information Via A Fourth Communication Protocol

*454*

Rate Of Received First Information Via The Fourth Communication Protocol < Threshold?    No Yes

SYSTEMS AND METHODS FOR ITEM TRACKING DURING LOGISTICS OPERATIONS

BACKGROUND

Logistics operations include the transportation and distribution (e.g., delivery) of items (e.g., packages) to destination locations (e.g., residences or businesses) and typically involve loading the items into a container (e.g., implemented as a storage unit affixed to or stored in a vehicle or a storage area integrated in at least a portion of a vehicle) for transportation and distribution. Items can be retrieved from the container and delivered at respective destination locations. Additionally, items can be collected from these destination locations and/or from other locations between deliveries. The number of items loaded into the container and delivered and/or collected during and/or between deliveries can impede the identification of items positioned in the container.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a flowchart illustrating step 406 of FIG. 4 in greater detail.

Figure 1:
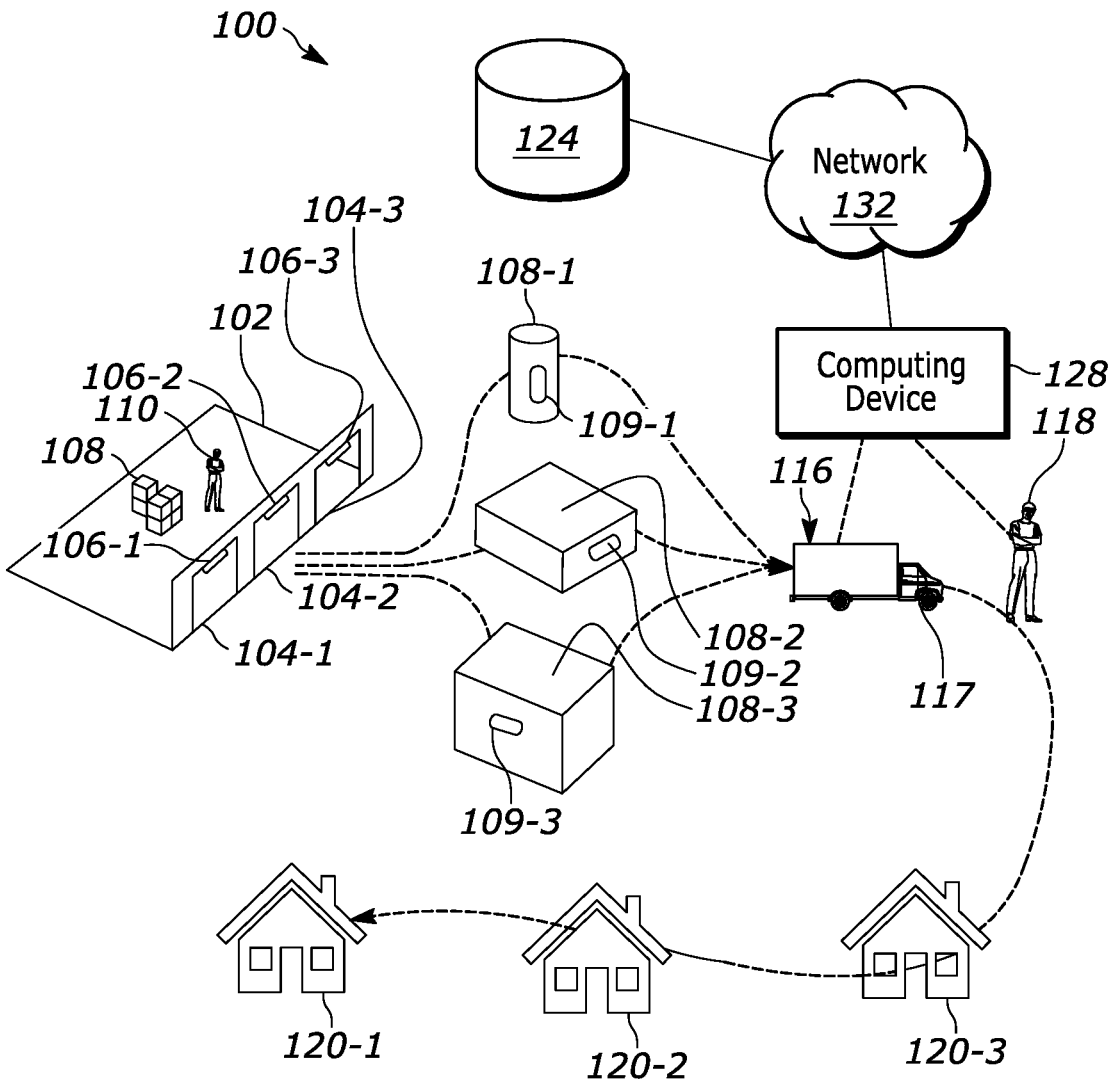
FIG. 1 is a diagram illustrating an embodiment of a system of the present disclosure for item tracking during logistics operations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As mentioned above, a number of items loaded into the container and delivered and/or collected during and/or between deliveries can impede the identification of items positioned in the container. Conventional systems and methods utilize static and/or manual processes to identify items stored in a container. For example, a worker (e.g., a loader) can manually scan identifying information (e.g., a barcode) of an item being loaded into a container. In another example, an operator (e.g., driver) of a vehicle having a container affixed thereto or integrated therein can manually scan identifying information (e.g., a barcode) of an item being retrieved from the container and delivered to a destination location and/or an item being collected from the destination location and/or another destination location and loaded into the container. These processes are manual (e.g., rely on human intervention) and, as such, can be time-consuming, cost-prohibitive, and subject to human error.

As such, conventional systems suffer from a general lack of versatility because these systems cannot automatically and dynamically identify items in a vehicle during different logistics operations (e.g., loading, delivery, and/or collection) based on a state of the container and/or a location thereof. For example, these systems cannot automatically and dynamically identify items loaded into and/or retrieved from a container based on a velocity of the container (e.g., whether the velocity of the container is greater than zero) and/or location thereof (e.g., an item handling facility such as a warehouse, manufacturing facility, retail facility, and transit facility such as an airport, depot, or the like). Overall, this lack of versatility causes conventional systems to provide underwhelming performance and reduce the efficiency and general timeliness of executing and completing logistics operations.

Thus, it is an objective of the present disclosure to eliminate these and other problems with conventional systems and methods via systems and methods that can automatically and dynamically identify items loaded into and/or retrieved from a container based on a state of the container and/or location thereof. For example, the systems and methods of the present disclosure alleviate the issues present with conventional systems by automatically and dynamically identifying items loaded into and/or retrieved from a container based on a velocity of the container (e.g., whether the velocity of the container is greater than zero) and/or location thereof (e.g., an item handling facility such as a warehouse, manufacturing facility, retail facility, and a transit facility such as an airport, depot, or the like).

In accordance with the above, and with the disclosure herein, the present disclosure includes improvements in computer functionality or in improvements to other technologies at least because the present disclosure describes that, e.g., logistics operational systems, and their related various components, may be improved or enhanced with the disclosed dynamic system features and methods that provide more efficient working conditions for workers and improved monitoring and management of logistics operations for system administrators. That is, the present disclosure describes improvements in the functioning of an operational system itself or "any other technology or technical field" (e.g., the field of distributed/commercial/industrial logistics information systems). For example, the disclosed dynamic system features and methods improve and enhance the identification of items loaded into and/or retrieved from a container by introducing automatic and dynamic identification of items loaded into and/or retrieved from the container based on at least one of a state of the container and a location thereof to mitigate (if not eliminate) worker error and eliminate inefficiencies typically experienced over time by systems lacking such features and methods. This improves the state of the art at least because such previous systems are inefficient as they lack the ability to automatically and dynamically identify items loaded into and/or retrieved from a container based on a velocity of the container (e.g., whether the velocity of the container is greater than zero) and/or location thereof (e.g., an item handling facility such as a warehouse, manufacturing facility, retail facility, and transit facility such as an airport, depot, or the like).

In addition, the present disclosure applies various features and functionality, as described herein, with, or by use of, a particular machine, e.g., a processor, a mobile device, a receiver or transceiver device (e.g., a radio frequency identification (RFID) reader or a Bluetooth Low Energy (BLE) gateway) and/or other hardware components as described herein.

Moreover, the present disclosure includes specific features other than what is well-understood, routine, conventional activity in the field, or adding unconventional steps that demonstrate, in various embodiments, particular useful applications, e.g., controlling signal processing protocols of a receiver or transceiver device (e.g., an RFID reader or a BLE gateway) in connection with a state of a container and/or location thereof.

Accordingly, it would be highly beneficial to develop a system and method that can automatically and dynamically identify items loaded into and/or retrieved from a container based on a velocity of the container (e.g., whether the velocity of the container is greater than 0) and/or location thereof (e.g., an item handling facility such as a warehouse, manufacturing facility, retail facility, and transit facility such as an airport, depot, or the like). The systems and methods of the present disclosure address these and other needs.

In an embodiment, the present disclosure is directed to a method for item tracking. The method comprises determining at least one of a first state and a second state of a container based on first data received from a first sensor associated with the container. Responsive to determining the first state of the container, the method modifies a communication protocol of a first device of the container, receives, by the first device, first information of at least one item associated with a first element, and determines the at least one item associated with the first element is positioned in the container based on the first information; and responsive to determining the second state of the container, the method identifies a first location of the container and modifies at least one of the communication protocol of the first device of the container and a communication protocol of the second device of the container based on whether the second device receives second information of the first location associated with a second element.

In an embodiment, the present disclosure is directed to a system for item tracking comprising a first sensor, a first device, a second device, one or more processors, and a non-transitory computer-readable memory coupled to the first sensor, the first device, the second device, and the one or more processors. The memory stores instructions thereon that, when executed by the one or more processors, cause the one or more processors to: determine at least one of a first state and a second state of a container based on first data received from the first sensor, the first sensor being associated with the container; responsive to determining the first state of the container, modify a communication protocol of the first device, receive, by the first device, first information of at least one item associated with a first element, and determine the at least one item associated with the first element is positioned in the container based on the first information; and responsive to determining the second state of the container, identify a first location of the container and modify at least one of the communication protocol of the first device and a communication protocol of the second device based on whether the second device receives second information of the first location associated with a second element.

In an embodiment, the present disclosure is directed to a tangible machine-readable medium comprising instructions for item tracking that, when executed, cause a machine to determine at least one of a first state and a second state of a container based on first data received from a first sensor associated with the container; responsive to determining the first state of the container, modify a communication protocol of a first device, receive, from a first device, first information of at least one item associated with a first element, and determine the at least one item associated with the first element is positioned in the container based on the first information; and responsive to determining the second state of the container, identify a first location of the container and modify at least one of the communication protocol of the first device and a communication protocol of the second device based on whether the second device receives second information of the first location associated with a second element.

Turning to the Drawings, FIG. 1 is a diagram 100 illustrating an embodiment of a system of the present disclosure for item tracking during logistics operations (e.g., loading, delivery, and/or collection operations). As shown in FIG. 1, an item handling facility 102 (e.g., a warehouse, manufacturing facility, retail facility, and transit facility such as an airport, depot, or the like) can have load bays 104-1, 104-2, and 104-3 (collectively referred to as load bays 104, and generically referred to as a load bay 104). The facility 102 can include a portion of a building, such as a cross dock or portion thereof, including the load bays 104.

The load bays 104 may, for example, be arranged along an outer wall of the facility 102, such that one or more containers 116 can be positioned proximate to the load bays 104 from the exterior of the facility 102. In other examples, smaller or greater numbers of load bays 104 may be included. The load bays 104 are illustrated as being dock structures enabling access from within the facility 102 to an exterior of the facility 102 where a container 116 is positioned. In other examples, one or more of the load bays 104 may be implemented as a load station within the facility 102, to load or unload containers 116 that are handled inside the facility 102.

Each load bay 104 may be equipped with a respective identifier element such as a transmitter or transceiver 106-1, 106-2, and 106-3 (collectively referred to as transmitters or transceivers 106, and generically referred to as transmitter or transceiver 106) to identify the facility 102 and/or each load bay 104. A transceiver 106 can include, but is not limited to, an RFID tag and a BLE tag.

Each load bay 104 may be configured to accommodate a container 116 such that one or more containers 116 can be positioned proximate to the load bays 104 from the exterior of the facility 102. The container 116 can be implemented as, but is not limited to, a storage unit affixed to or stored in a vehicle 117 such as a box portion of a box truck in which the box is affixed to a body of a vehicle which also supports a cab, powertrain, and the like, a semi-trailer including an enclosed box (e.g., trailer) affixed to a platform including one or more sets of wheels and a hitch assembly for towing by a powered vehicle, and a unit loading device (ULD) of the type employed to load luggage, freight and the like into aircraft. The container 116 can also be implemented as, but is not limited to, a storage area integrated in at least a portion of a vehicle 117 including a van (e.g., a cargo van or a sprinter van) and a sports utility vehicle (SUV). The container 116 may have a substantially horizontal internal depth, extending from an open end (e.g., a wall with a door or other opening allowing access to an interior of the container 116) of the container 116 to a closed end, a substantially horizontal internal width perpendicular to the depth, and a substantially vertical internal height.

Each load bay 104 includes an opening, e.g., in a wall of the facility 102, that allows staff 110 and/or equipment within the facility 102 to access an interior of the container 116. For example, when a container 116 is positioned at a load bay 104 (e.g., with the open end of the container 116 substantially flush with the opening of the load bay 104), items 108-1, 108-2, and 108-3 (collectively referred to as the items 108, and generically referred to as an item 108) can be loaded into the container 116 (e.g., from a staging area for unloaded items 108) or unloaded from the container 116 for processing within the facility 102. In some examples, the facility 102 includes one or more conveyor belts or other item transport mechanisms (not shown) to transport and load items 108 into the container 116 or unload items 108 from the container 116 to other locations within the facility 102.

In logistics operations, a wide variety of items, such as packages and other freight, can be transported from origin locations to destination locations, often via a variety of intermediate locations. As shown in FIG. 1, items 108 may be transported from the facility 102 to destination locations, such as residences 120-1, 120-2, and 120-3 (collectively referred to as the destination locations 120, and generically referred to as a destination location 120) via a container 116 implemented as a storage unit affixed to or stored in a vehicle 117 (e.g., a box truck, a semi-trailer, or the like) or a container 116 implemented as a storage area integrated in at least a portion of a vehicle 117 such as a van (e.g., a cargo van or a sprinter van) and an SUV. At each destination location 120, the operator 118 or an autonomous apparatus such as a drone can retrieve the relevant item(s) 108 destined for that destination location 120, remove the relevant item(s) 108 from the container 116, and deliver the relevant item(s) 108 to the destination location 120 before proceeding to the next destination location 120. Additionally, items 108 can be collected from these destination locations 120 and/or from other destination locations between deliveries. Each item 108 may be equipped with a respective identifier element such as a transmitter or transceiver 109-1, 109-2, and 109-3 (collectively referred to as transmitters or transceivers 109, and generically referred to as a transmitter or transceiver 109) to identify the item 108. A transmitter or transceiver 109 can include, but is not limited to, an RFID tag and a BLE beacon. The number of items 108, and the number of destination locations 120, can vary, and need not be equal in other examples (e.g., more than one item 108 can be delivered to a single destination location 120).

Associations between items 108 and destination locations 120 can be stored in a central repository 124, which can also contain data defining a route that specifies a sequence in which the container 116 is to travel to the destination locations 120. The repository 124 can also contain a variety of other data defining the items 108, such as sender identities and locations, item identifier elements (e.g., a transmitter or transceiver 109 such as an RFID tag or a BLE beacon uniquely distinguishing each item 108 from other items 108), item dimensions (e.g., one or more of width, length, and height), item weights, and the like.

As mentioned above, the number of items loaded into the container 116 and delivered and/or collected during and/or between deliveries can impede the identification of items 108 positioned in the container 116. The system includes components and functionality to track the items 108 in the container 116. Tracking the storage of the items 108 in the container 116 allows the system to generate and update an inventory of items 108 in the container 116.

As described in greater detail below, the system includes a computing device 128 associated with the container 116, vehicle 117 and/or the operator 118. The computing device 128 includes, or is communicatively coupled with, sensors and devices disposed within an interior and/or exterior of the container 116. As shown in FIG. 1, the computing device 128 can exchange data with the central repository 124, e.g., via a network 132 implemented as any suitable combination of local and wide-area networks. The sensors and devices disposed in the interior and/or on the exterior of the container 116 enable the computing device 128 to track each item 108 as each item 108 is placed in the container 116, e.g., on a support structure such as a shelf. The computing device 128 can therefore record each item 108 positioned in the container 116 and can generate and update an inventory of items 108 in the container 116.

Figure 2:
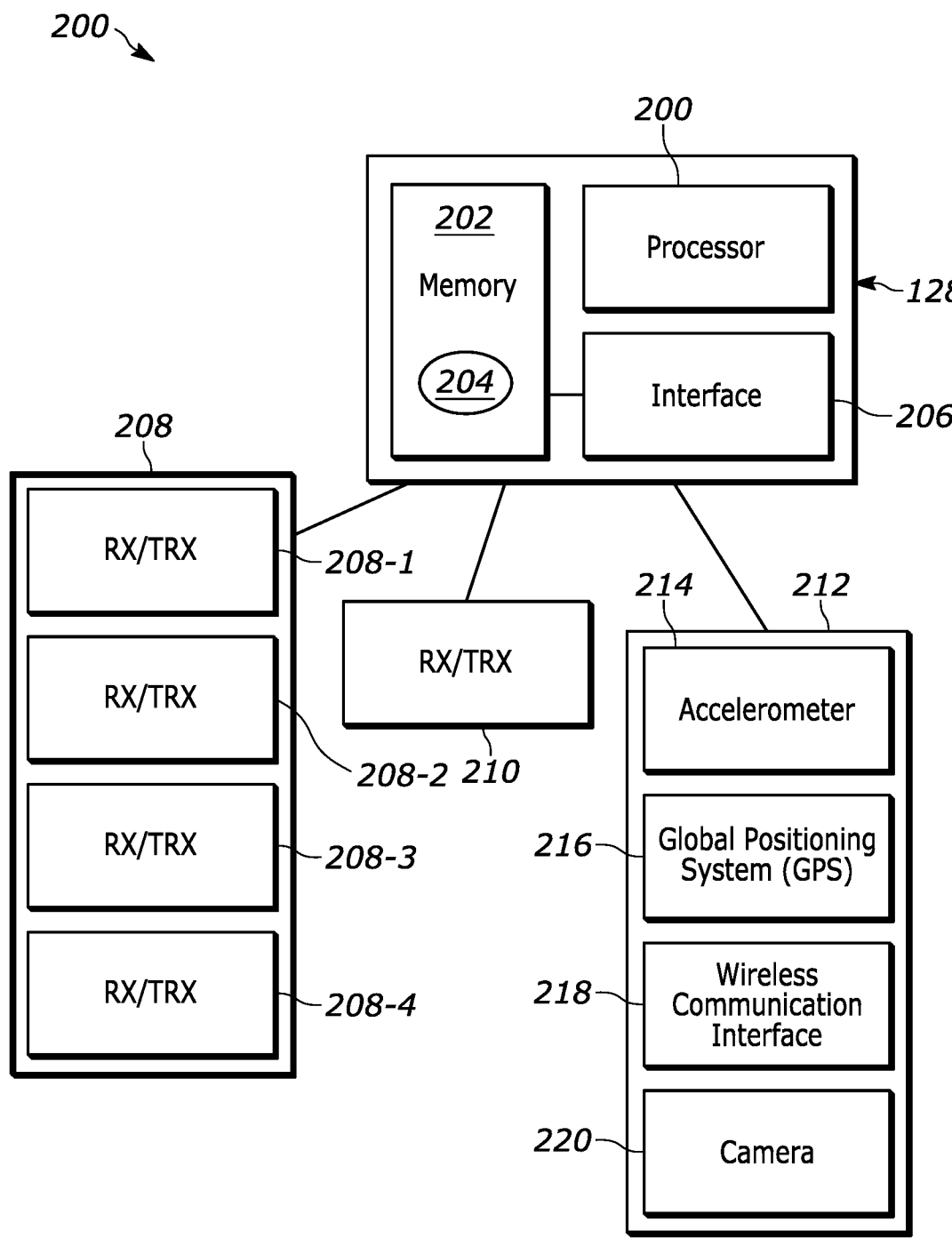
FIG. 2 is a diagram illustrating components of the computing device of FIG. 1, sensors, and devices.

FIG. 2 is a diagram 200 illustrating components of the computing device 128 of FIG. 1 and sensors and devices. The computing device 128 can include, or can be communicatively coupled with, sensors and/or devices disposed in an interior of the container 116 and sensors and/or devices disposed on an exterior of the container 116. As illustrated in FIG. 2, the computing device 128 includes a processor 200, such as a central processing unit (CPU), a graphics processing unit (GPU), or a combination thereof. The processor 200 is communicatively coupled with a non-transitory computer-readable storage medium such as a memory 202, implemented as a suitable combination of volatile and non-volatile memory elements. The memory 202 can store a plurality of computer-readable instructions, e.g., in the form of a tracking application 204 executable by the processor 200 to perform functionality discussed in greater detail below. The application 204, in other examples, can be implemented as a suite of distinct applications, or as a dedicated hardware element (e.g., an application-specific integrated circuit (ASIC)).

The computing device 128 also includes a communications interface 206 enabling communication between the device 128 and other computing devices (e.g., a server hosting the central repository 124), via suitable short-range links, networks such as the network 132, and the like. The interface 206 therefore includes suitable hardware elements, executing suitable software and/or firmware, to communicate over the network 132 and/or other communication links.

The computing device 128 includes, or is otherwise communicatively coupled with, one or more interior devices 208 (e.g., receivers or transceivers 208-1, 208-2, 208-3, and 208-4 such as RFID readers or BLE gateways and collectively referred to as the interior receivers or transceivers 208, and generically referred to as an interior receiver or transceiver 208) disposed in an interior of the container 116, an exterior device 210 (e.g., a receiver or transceiver such as RFID reader or BLE gateway) disposed on an exterior of the container 116, and a plurality of sensors 212 including, but not limited to, an accelerometer 214, a global positioning system (GPS) 216, a wireless communication interface 218, and a camera 220.

An interior receiver or transceiver 208 can be disposed on a ceiling of the container 116, at a doorway to the container 116, and/or at any suitable location in the interior of the container 116. An interior receiver or transceiver 208 can include, for example, a directional reader configured to detect transmitter or transceivers 109 affixed to items 108, or affixed to bins or containers carrying the items 108, when items 108 are positioned in the container 116 and/or as the items 108 pass through the doorway as well as to detect the direction in which the transmitters or transceivers 109 are traveling (e.g., whether a transmitter or transceiver 109 is entering or exiting the container 116). The transmitters or transceivers 109 can be one of an RFID tag or a BLE beacon and can uniquely distinguish each item 108 from other items 108.

The exterior receiver or transceiver 210 can be disposed on an exterior of the container 116 and/or an exterior of the vehicle 117 including, but not limited to, a roof, a rear bumper, a rear door and/or at any suitable location on the exterior of the container 116 and/or vehicle 117. The exterior receiver or transceiver 210 can include, for example, a directional reader configured to detect transmitters or transceivers 109 affixed to items 108, or affixed to bins or containers carrying the items 108 proximate to an exterior of the container 116 and/or the vehicle 117. The exterior transmitter or transceiver 210 can also include, for example, a directional reader configured to detect transmitters or transceivers 106 affixed to a facility 102 and/or any suitable portion (e.g., a load bay 104) thereof to uniquely identify the facility 102 and/or each load bay 104. A transmitter or transceiver 106 can include, but is not limited to, an RFID tag and a BLE beacon.

The plurality of sensors 212 include any one of, or any suitable combination of, sensors configured to facilitate tracking items 108 in the container 116 in conjunction with an interior receiver or transceiver 208 and an exterior receiver or transceiver 210. For example, the plurality of sensors 212 can include, but is not limited to, an accelerometer 214, a global positioning system (GPS) 216, a wireless communication interface 218, and a camera 220. The accelerometer 214 can generate data indicative of a velocity of the container 116. The velocity of the container 116 can be indicative of a movement state of the container 116 (e.g., in motion or stationary) and/or a location thereof (e.g., whether the vehicle 116 is positioned at a facility 102) when the container 116 is stationary. In an embodiment, the system can utilize the GPS 216 or the wireless communication interface 218 (e.g., having Wi-Fi® and/or Bluetooth® functionalities) to generate and/or transmit data indicative of a movement state of the container 116 and/or a location thereof. The plurality of sensors 212 can further include one or more cameras 220, such as color and/or depth cameras disposed within the container 116 to observe at least a portion of the container 116. Via the camera(s) 220, the computing device 128 can obtain sequences of images in which the movement and placement of items 108 in the container 116 can be tracked.

Figure 3A:
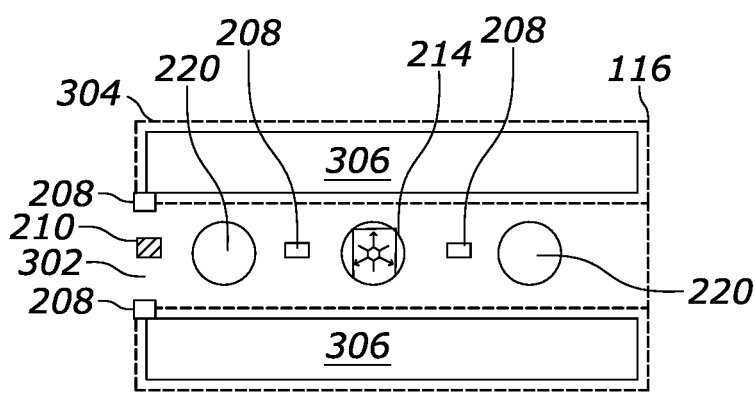
FIG. 3A is a diagram illustrating an overhead view of the container of FIG. 1 and an arrangement of sensors and devices thereof.
Figure 3B:
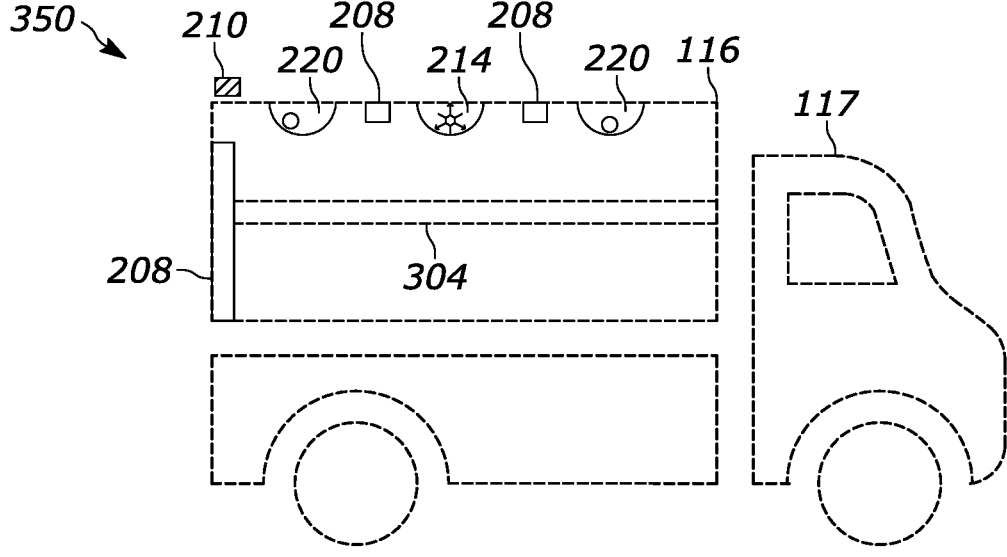
FIG. 3B is a diagram illustrating a side view of the container of FIG. 1 and an arrangement of sensors and devices thereof.

FIG. 3A is a diagram 300 illustrating an overhead view of the container 116 of FIG. 1 and an example arrangement of sensors and devices thereof and FIG. 3B is a diagram 350 illustrating a side view of the container 116 of FIG. 1 and an example arrangement of sensors and devices thereof. As shown in FIGS. 3A and 3B, the interior receivers or transceivers 208, accelerometer 214 and cameras 220 can be disposed at various positions in the container 116. For example, the interior receivers or transceivers 208 can be disposed at a doorway 302 into the container 116 and on a ceiling thereof. Additionally, the exterior receiver or transceiver 210 can be disposed on a roof of the container 116.

The container 116 can include at least one support structure such as a shelf 304 (two shelves 304 at approximately the same height are shown), onto which items 108 can be positioned. At least one of the shelves 304 (and in the illustrated example, both of the shelves 304) may carry a liner 306. The container 116 can further include at least one camera 220, e.g., mounted to a ceiling of the container 116, with a field of view (FOV) that encompasses at least a portion of the container 116. In some examples, as illustrated, more than one camera 220 can be deployed to provide greater coverage of the container 116. In some examples, the cameras 220 can be mounted to walls instead of, or in addition to, the ceiling. The cameras 220 may also have movable lens assemblies, to redirect their FOVs.

Figure 4:
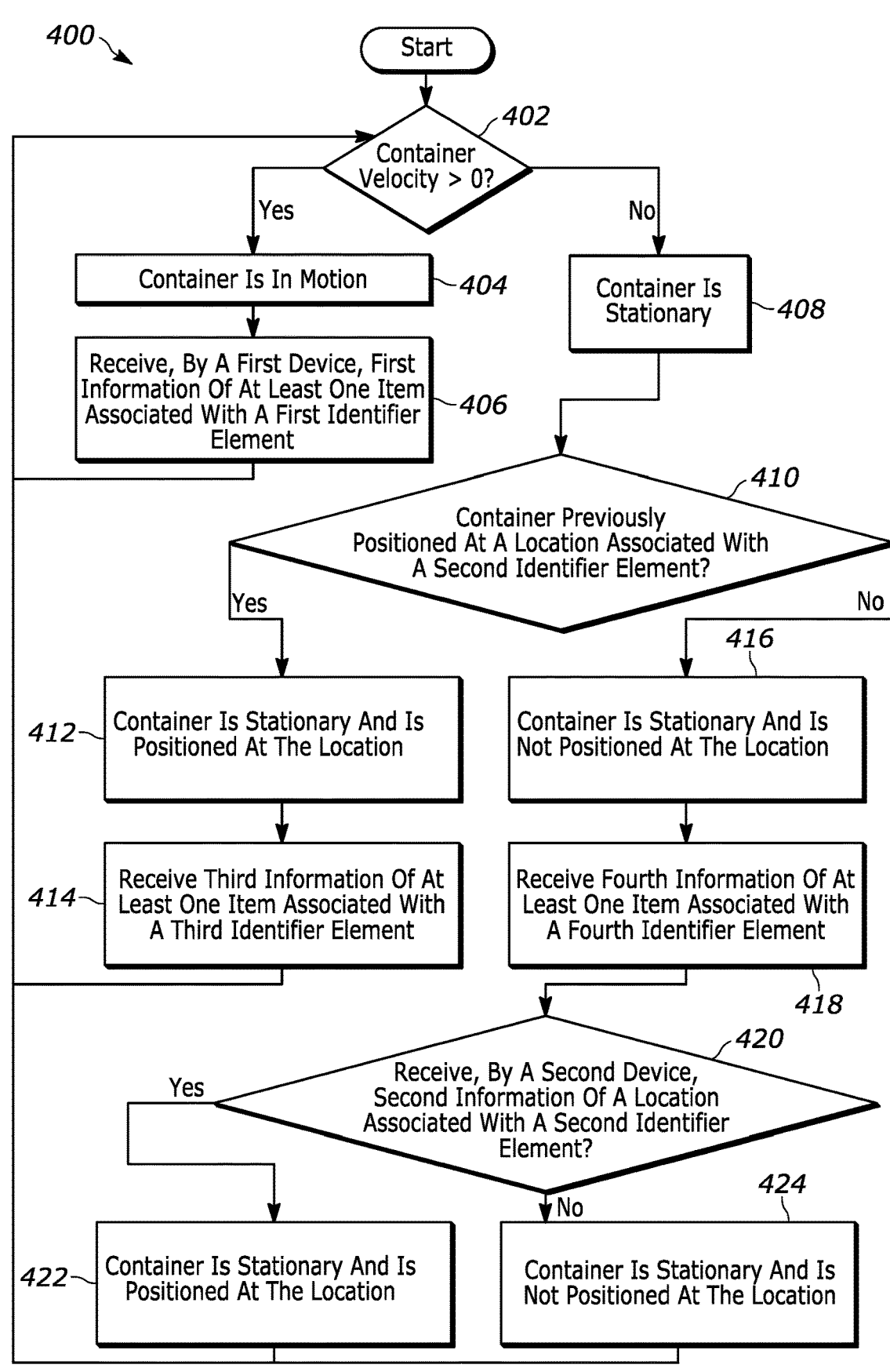
FIG. 4 is a flowchart illustrating processing steps carried out by an embodiment of the present disclosure.

FIG. 4 is a flowchart illustrating processing steps carried out by an embodiment of the present disclosure. The processing steps will be described in conjunction with their performance in the system (e.g., by the computing device 128 in conjunction with the interior receiver or transceiver 208, exterior receiver or transceiver 210, and plurality of sensors 212). In general, via performance of the processing steps, the system can automatically and dynamically identify items 108 loaded into and/or retrieved from a container 116 based on state of the container 116 and/or a location thereof. For example, the system can automatically and dynamically identify items 108 loaded into and/or retrieved from the container 116 based on a velocity of the container 116 (e.g., whether the velocity of the container 116 is greater than zero) and/or a location thereof (e.g., an item handling facility 102 such as a warehouse, manufacturing facility, retail facility, and a transit facility such as an airport, depot, or the like).

Beginning in step 402, the system determines whether a velocity of the container 116 is greater than zero based on data received from a sensor (e.g., the accelerometer 214) associated with the container 116. If the system determines that the velocity of the container 116 is greater than zero, then in step 404, the system determines that the container 116 is in motion (e.g., the container is moving). The process then proceeds to step 406. Alternatively, if the system determines that the velocity of the container is not greater than zero, then in step 408, the system determines that the container 116 is stationary (e.g., the container is not moving). In step 406, the system receives, by a first device (e.g., interior receiver or transceiver 408) first information of at least one item 108 associated with a first identifier element (e.g., a transmitter or transceiver 109).

FIG. 5 is a flowchart illustrating step 406 of FIG. 4 in greater detail. A population of items 108 and associated transmitters or transceivers 109 in an interior of the container 116 remains relatively constant when the container 116 is in motion. As such, the system can configure an interior receiver or transceiver 208 to capture information from a greatest amount of transmitters or transceivers 109 when the container 116 is in motion. For example, the system can modify a communication protocol of an interior receiver or transceiver 208 to switch between several communication protocols to isolate unique transmitters or transceivers 109 when the container 116 is in motion as described below in relation to FIG. 5.

As shown in FIG. 5, when the container 116 is in motion and the transmitters or transceivers 109 are RFID tags, the system can modify a communication protocol of a first device (e.g., an interior receiver or transceiver 208) to switch between several communication protocols (e.g., Electronic Product Code (EPC) Generation 2 (Gen 2) Standard sessions 2A, 3A, 2B and 3B) based on a read rate of the interior receiver or transceiver 208. For example, the interior receiver or transceiver 208 can switch between EPC Gen 2 Standard sessions 2A, 3A, 2B and 3B when the interior receiver or transceiver 208 read rate is less than a threshold (e.g., an integer value N (e.g., 1) of tags read per a time duration M (e.g., 10 seconds)).

Beginning in step 440, the interior receiver or transceiver 208 receives first information of at least one item 108 associated with a transmitter or transceiver 109 via a first communication protocol. The first information can be identification information of the item 108 and/or of the transmitter or transceiver 109 associated therewith, and the first communication protocol can be EPC Gen 2 Standard session 2A. In step 442, the system determines whether a rate of the received first information via the first communication protocol is less than a threshold. If the system determines that the rate of the received first information via the first communication protocol is less than the threshold, then the process proceeds to step 444. If the system determines that the rate of the received first information via the first communication protocol is greater than the threshold, then the process returns to step 440.

In step 444, the interior receiver or transceiver 208 receives first information of at least one item 108 associated with a transmitter or transceiver 109 via a second communication protocol. The first information can be identification information of the item 108 and/or of the transmitter or transceiver 109 associated therewith, and the second communication protocol can be EPC Gen 2 Standard session 3A. In step 446, the system determines whether a rate of the received first information via the second communication protocol is less than a threshold. If the system determines that the rate of the received first information via the second communication protocol is less than the threshold, then the process proceeds to step 448. If the system determines that the rate of the received first information via the second communication protocol is greater than the threshold, then the process returns to step 444.

In step 448, the interior receiver or transceiver 208 receives first information via of at least one item 108 associated with a transmitter or transceiver 109 via a third communication protocol. The first information can be identification information of the item 108 and/or of the transmitter or transceiver 109 associated therewith, and the third communication protocol can be EPC Gen 2 Standard session 2B. In step 450, the system determines whether a rate of the received first information via the third communication protocol is less than a threshold. If the system determines that the rate of the received first information via the third communication protocol is less than the threshold, then the process proceeds to step 452. If the system determines that the rate of the received first information via the third communication protocol is greater than the threshold, then the process returns to step 448.

In step 452, the interior receiver or transceiver 208 receives first information of at least one item 108 associated with a transmitter or transceiver 109 via a fourth communication protocol. The first information can be identification information of the item 108 and/or of the transmitter or transceiver 109 associated therewith, and the fourth communication protocol can be EPC Gen 2 Standard session 3B. In step 454, the system determines whether a rate of the received first information via the fourth communication protocol is less than a threshold. If the system determines that the rate of the received first information via the fourth communication protocol is less than the threshold, then the process proceeds to step 440. If the system determines that the rate of the received first information via the fourth communication protocol is greater than the threshold, then the process returns to step 452.

Referring back to FIG. 4 and as mentioned above, if the system determines the velocity of the container is not greater than zero, then in step 408, the system determines the container 116 is stationary (e.g., the container is not moving). Then, in step 410, the system determines whether the container 116 was previously positioned or is positioned at a location associated with a second identifier element (e.g., a transmitter or transceiver 106). For example, the system can determine whether a second device (e.g., an exterior receiver or transceiver 210) receives second information of the location associated with the second identifier element (e.g., a transmitter or transceiver 106). The second information can be identification information of the location and/or of the transmitter or transceiver 106 associated therewith. For example, the second information can be at least one of an address, coordinates, a lot/parcel, a zone, an area (e.g., a load bay 104), etc. of a facility 102 (e.g., a warehouse, a manufacturing facility, a retail facility, and a transit facility such as an airport, depot, or the like) and/or an identification number of the transmitter or transceiver 106. If the system determines the exterior receiver or transceiver 210 receives the second information of the facility 102 associated with the transmitter or transceiver 106, then in step 412, the system determines the container 116 is stationary and is positioned at the facility 102. Then, the process proceeds to step 414. In step 414, the system receives third information of at least one item 108 associated with a third identifier element (e.g., a transmitter or transceiver 109). Alternatively, if the system determines the exterior receiver or transceiver 210 does not receive the second information of the facility 102 associated with the transmitter or transceiver 106, then in step 416, the system determines the container 116 is stationary and is not positioned at the facility 102. Then, the process proceeds to step 418.

Figure 6:
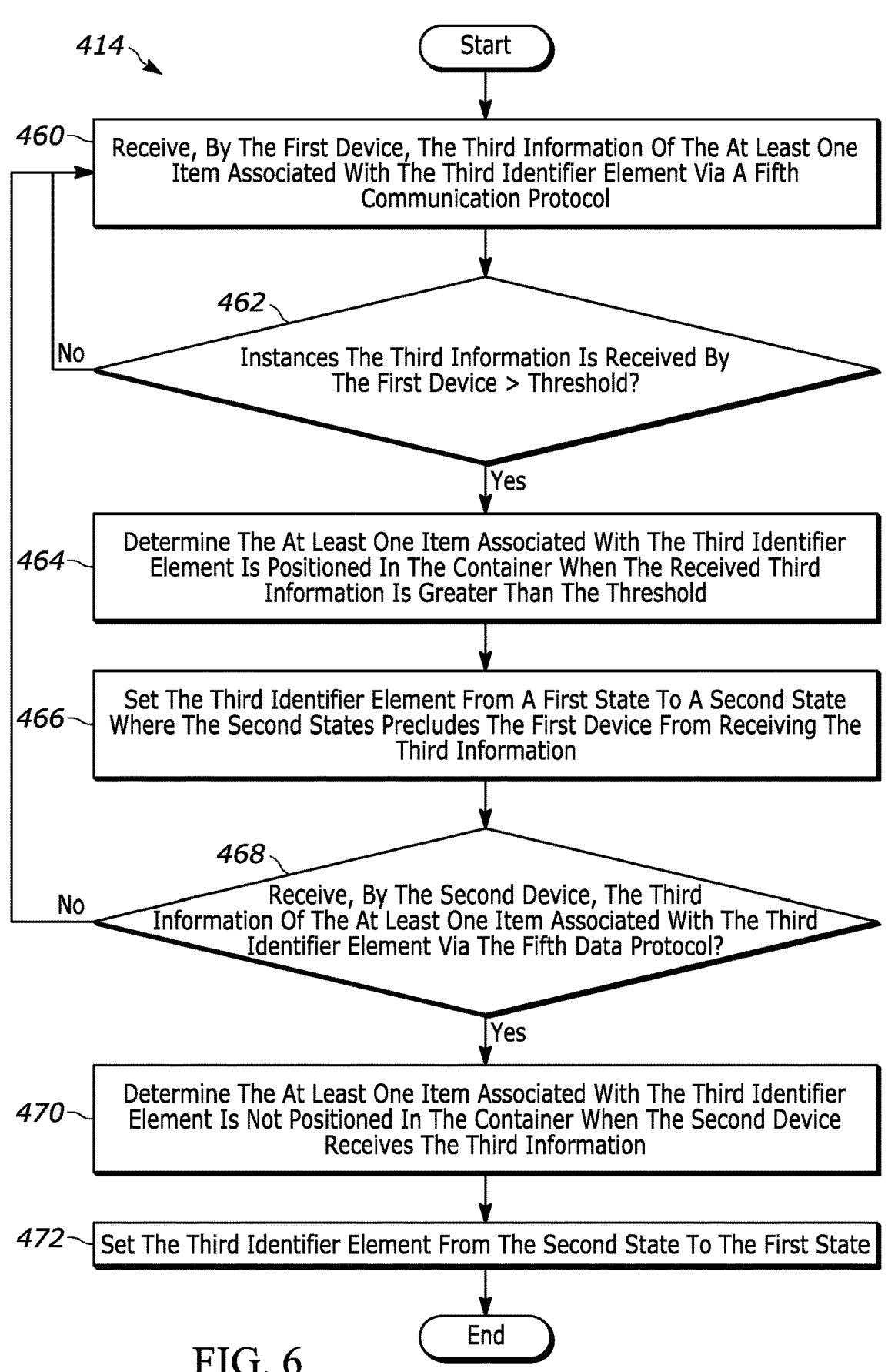
FIG. 6 is a flowchart illustrating step 414 of FIG. 4 in greater detail.

FIG. 6 is a flowchart illustrating step 414 of FIG. 4 in greater detail. A population of items 108 and transmitters or transceivers 109 associated therewith positioned in the container 116 can increase when the container 116 is stationary and positioned at the facility 102 (e.g., during loading of the container 116). As such, the system can configure an interior receiver or transceiver 208 to capture information from a greatest number of transmitters or transceivers 109 entering the container 116 when the container 116 is stationary and positioned at the facility 102. For example, the system can modify a communication protocol of an interior receiver or transceiver 208 to improve an available bandwidth of the interior receiver or transceiver 208 to capture information from an increasing population of items 108 and transmitters or transceivers 109 associated therewith when the container 116 is stationary and positioned at the facility 102 as described below in relation to FIG. 6.

As shown in FIG. 6, when the container is stationary, positioned at the facility 102 and the transmitters or transceivers 109 are RFID tags, the system can modify a communication protocol of a first device (e.g., an interior receiver or transceiver 208), and the system can change a state of a transmitter or transceiver 109 based on a number of instances the interior receiver or transceiver 208 receives (e.g., reads) information of at least one item and/or an associated transmitter or transceiver 109. For example, the interior receiver or transceiver 208 can switch to the EPC Gen 2 Standard session 1A communication protocol and can set a flag state of a transmitter or transceiver 109 from a first (e.g., deselected) state to a second (e.g., selected) state when the number of instances the interior receiver or transceiver 208 reads the information of the transmitter or transceiver 109 is greater than a threshold. It should be understood that the interior receiver or transceiver 208 does not read information of transmitters or transceivers 109 having a selected flag state. In this way, the system can improve an available bandwidth of the interior receiver or transceiver 208 to capture information from an increasing population of items 108 and transmitters or transceivers 109 associated therewith being loaded into the container 116.

Beginning in step 460, the first device (e.g., interior receiver or transceiver 208) receives third information of at least one item 108 associated with a transmitter or transceiver 109 via a fifth communication protocol. The third information can be identification information of the at least one item 108 and/or the transmitter or transceiver 109 associated therewith, and the fifth communication protocol can be EPC Gen 2 Standard session 1A. In step 462, the system determines whether a number of instances the interior receiver or transceiver 208 receives (e.g., reads) the third information of the at least one item 108 associated with a transmitter or transceiver 109 is greater than a threshold. The threshold can be a fixed or variable integer value (e.g., 150) indicative of a number of reads by the interior receiver or transceiver 208. If the system determines the number of instances the interior receiver or transceiver 208 receives the third information of the at least one item 108 associated with a transmitter or transceiver 109 is greater than the threshold, then the process proceeds to step 464. Alternatively, if the system determines the number of instances that the interior receiver or transceiver 208 receives the third information of the transmitter or transceiver 109 is less than the threshold, then the process returns to step 460.

In step 464, the system determines the at least one item 108 associated with the transmitter or transceiver 109 is positioned in the container 116. In step 466, the system sets the flag state of the transmitter or transceiver 109 from a first (e.g., deselected) state to a second (e.g., selected) state. As mentioned above, setting the flag state of the transmitter or transceiver 109 from the deselected first state to the selected second state precludes the interior receiver or transceiver 208 from receiving the third information from the at least one item 108 associated with the transmitter or transceiver 109. In this way, the system can improve an available bandwidth of the interior receiver or transceiver 208 to capture information of other items 108 and/or transmitters or transceivers 109 associated therewith being loaded into the container 116.

In step 468, the system determines whether the exterior receiver or transceiver 210 receives third information of the at least one item associated with the transmitter or transceiver 109 via the fifth communication protocol. The third information can be identification information of the item 108 and/or of the transmitter or transceiver 109 associated therewith, and the fifth communication protocol can be EPC Gen 2 Standard session 1A. If the system determines the exterior receiver or transceiver 210 does not receive the third information of the at least one item 108 associated with the transmitter or transceiver 109 via the EPC Gen 2 Standard session 1A communication protocol, then the process returns to step 460. Alternatively, if the system determines the exterior receiver or transceiver 210 receives the third information of the at least one item 108 associated with the transmitter or transceiver 109 via the EPC Gen 2 Standard session 1A communication protocol, then the process proceeds to step 470. In step 470, the system determines the at least one item 108 and associated transmitter or transceiver 109 is not positioned in the container 116. Then, in step 472, the system sets the flag state of the transmitter or transceiver 109 from the second (e.g., selected) state to the first (e.g., deselected) state. In this way, the third information of the at least one item 108 and associated transmitter or transceiver 109 can be captured by the interior receiver or transceiver 208 if the at least one item 108 and associated transmitter or transceiver 109 re-enter the container 116 or the third information of the at least one item 108 and associated transmitter or transceiver 109 can be captured by a different interior receiver or transceiver 208 of a different container 116 (e.g., if the at least one item 108 and associated transmitter or transceiver 109 therewith is moved to another container 116).

Referring back to FIG. 4 and as mentioned above, in step 410, if the system determines the exterior transceiver 210 does not receive the second information of the facility 102 associated with the transceiver 106, then in step 416, the system determines the container 116 is stationary and is not positioned at the facility 102 (e.g., the container 116 can be stationary during a delivery and/or collection operation and positioned at a destination location 120). Then, the process proceeds to step 418. In step 418, the system receives fourth information of at least one item 108 associated with a fourth identifier element (e.g., a transceiver 109).

Figure 7:
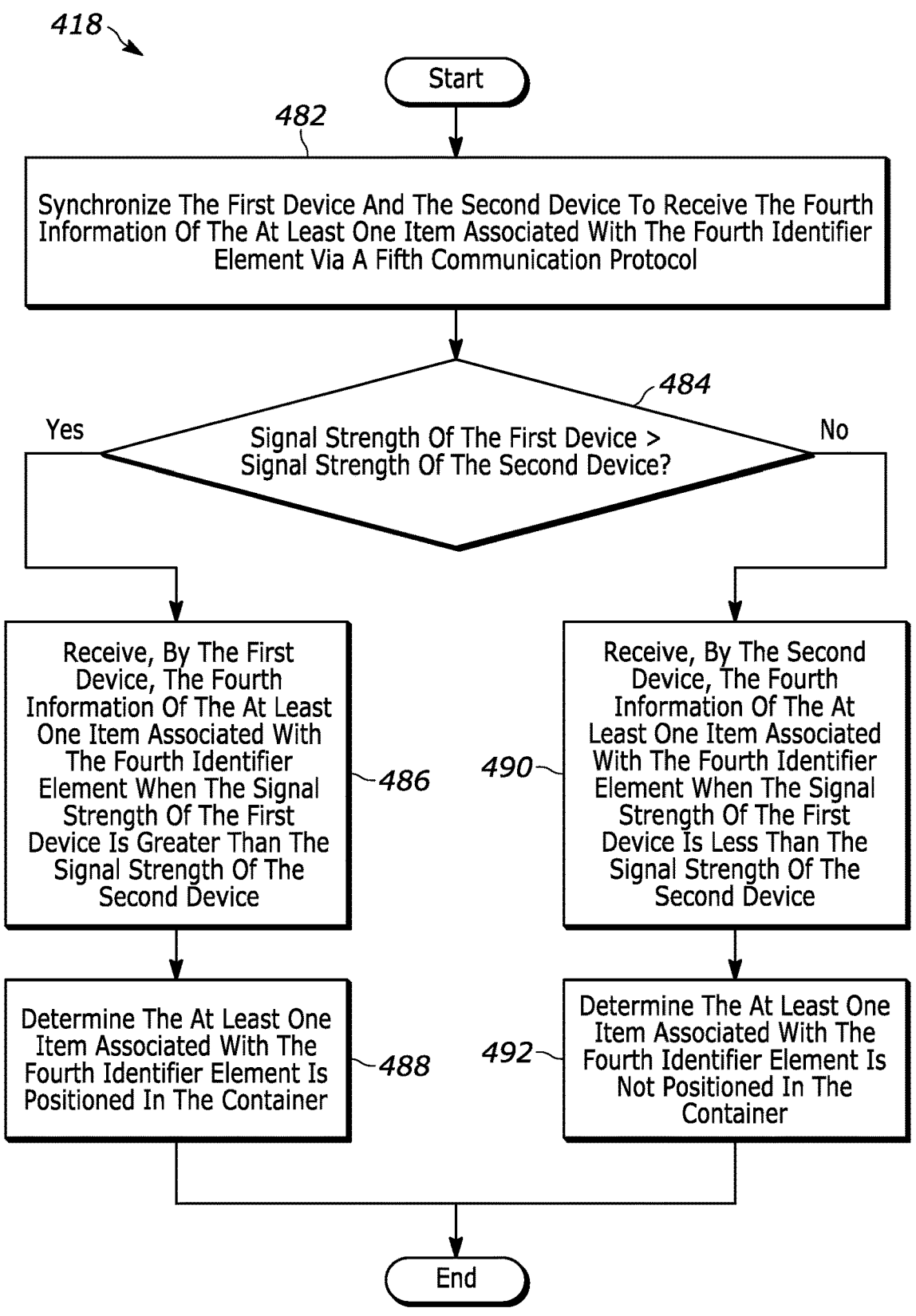
FIG. 7 is a flowchart illustrating step 418 of FIG. 4 in greater detail.

FIG. 7 is a flowchart illustrating step 418 of FIG. 4 in greater detail. A population of items 108 and transmitters or transceivers 109 associated therewith can fluctuate when the container 116 is stationary and is not positioned at the facility 102. For example, an item 108 and associated transmitter or transceiver 109 can be retrieved from the container 116 for delivery at a destination location 120 and/or an item 108 and associated transmitter or transceiver 109 can be collected from a destination location 120 and positioned in the container 116. In these cases, an item 108 and associated transmitter or transceiver 109 may only be in the FOV of an exterior receiver or transceiver 210 for a short period of time. Accordingly, the system can configure the interior receiver or transceiver 208 and the exterior receiver or transceiver 210 such that the system can capture information from transmitters or transceivers 109 that are not positioned in the container 116 (e.g., positioned proximate to an exterior of the container 116) as described below.

By way of background, radio frequency (RF) power decreases with a square of the distance between a transmitter and a receiver. Thus, transmitters and receivers can be arranged such that a signal received by a receiver positioned in an interior of a container from a transmitter positioned in the interior of the container is stronger than the same signal received by a receiver that is not positioned in the interior of the container (e.g., positioned on an exterior of the container) during the same time period and vice versa. When the transmitters are RFID tags and the receivers are RFID readers and the interior and exterior RFID readers are synchronized (e.g., their respective inventory rounds start and stop at a same time via a signal on a general-purpose input/output (GPIO) port), then the RFID tags will only transmit information to the reader with the strongest signal and not respond to any readers with weaker signals. For example, if the interior and exterior RFID readers are synchronized, then reads of RFID tags positioned in the container can be confined to the interior RFID readers and reads of RFID tags that are not positioned in the container can be confined to the exterior RFID readers.

As shown in FIG. 7, when the container is stationary, is not positioned at the facility 102 and the transmitters or transceivers 109 are RFID tags, the system can modify a communication protocol of each of a first device (e.g., an interior receiver or transceiver 208) and a second device (e.g., an exterior receiver or transceiver 210) and synchronize the interior receiver or transceiver 208 and the exterior receiver or transceiver 210. For example, each of the interior receiver or transceiver 208 and exterior receiver or transceiver 210 can switch to the EPC Gen 2 Standard session 1A communication protocol and can be synchronized (e.g., their respective inventory rounds start and stop at a same time via a signal on a GPIO port) such that the transmitters or transceivers 109 respond to the receiver or transceiver 208 or 210 having a strongest signal.

Beginning in step 482, the system synchronizes a first device (e.g., interior receiver or transceiver 208) and a second device (e.g., exterior receiver or transceiver 210) to receive fourth information of at least one item 108 associated with a transmitter or transceiver 109 via a fifth communication protocol. The fourth information can be identification information of the at least one item 108 and/or the transmitter or transceiver 109 associated therewith, and the fifth communication protocol can be EPC Gen 2 Standard session 1A. In step 484, the system determines whether a signal strength of the interior receiver or transceiver 208 is greater than a signal strength of the exterior receiver or transceiver 210. If the system determines the signal strength of the interior receiver or transceiver 208 is greater than the signal strength of the exterior receiver or transceiver 210, then the process proceeds to step 486. In step 486, the interior receiver or transceiver 208 receives the fourth information of the at least one item 108 associated with the transmitter or transceiver 109. Then, in step 488, the system determines the at least one item 108 associated with the transmitter or transceiver 109 is positioned in the container 116. Alternatively, if the system determines the signal strength of the interior receiver or transceiver 208 is less than the signal strength of the exterior receiver or transceiver 210, then the process proceeds to step 490. In step 490, the exterior receiver or transceiver 210 receives the fourth information of the at least one item 108 associated with the transmitter or transceiver 109. Then, in step 492, the system determines the at least one item 108 associated with the transmitter or transceiver 109 is not positioned in the container 116.

Referring back to FIG. 4, in step 420, the system determines whether the second device (e.g., exterior receiver or transceiver 210) receives second information of the location associated with the second identifier element (e.g., transmitter or transceiver 106). The second information can be identification information of the location and/or of the transmitter or transceiver 106 associated therewith. For example, the second information can be at least one of an address, coordinates, a lot/parcel, a zone, an area (e.g., a load bay 104), etc. of a facility 102 (e.g., a warehouse, a manufacturing facility, a retail facility, and a transit facility such as an airport, depot, or the like) and/or an identification number of the transmitter or transceiver 106. If the system determines the exterior receiver or transceiver 210 receives the second information of the facility 102 associated with the transmitter or transceiver 106, then in step 422, the system determines the container 116 is stationary and is positioned at the facility 102. Then, the process returns to step 402. Alternatively, if the system determines the exterior receiver or transceiver 210 does not receive the second information of the facility 102 associated with the transmitter or transceiver 106, then the process proceeds to step 424. In step 424, the system determines the container 166 is stationary and is not positioned at the facility 102 (e.g., the container 116 can be stationary during a delivery and/or collection operation and positioned at a destination location 120). Then, the process returns to step 402.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method for item tracking, comprising:
determining at least one of a first state and a second state of a container based on first data received from an accelerometer associated with the container;
responsive to determining the first state of the container,
modifying a communication protocol of a first radio frequency identification (RFID) reader positioned in an interior of the container,
receiving, by the first RFID reader, first information of at least one item associated with a first RFID tag, and
determining the at least one item associated with the first RFID tag is positioned in the container based on the first information; and
responsive to determining the second state of the container,
identifying a first location of the container and modifying at least one of the communication protocol of the first RFID reader of the container and a communication protocol of a second RFID reader positioned on an exterior of the container based on whether the second RFID reader receives second information of the first location associated with a second RFID tag,
identifying the first location of the container and receiving, by the first RFID reader, third information of at least one item associated with a third RFID tag via another communication protocol when the second RFID reader receives the second information of the first location associated with the second RFID tag,
determining whether the at least one item associated with the third RFID tag is positioned in the container based on the identified first location of the container and the third information,
determining the at least one item associated with the third RFID tag is positioned in the container and setting the third RFID tag from a first state to a second state when a number of instances of receiving the third information by the first RFID reader is greater than a second threshold,
wherein the second state of the third RFID tag precludes the first RFID reader from receiving the third information.

2. The method of claim 1, further comprising:
receiving, by the first RFID reader, the first information of the at least one item associated with the first RFID tag via one of a first communication protocol, a second communication protocol, a third communication protocol and a fourth communication protocol by switching between the first, second, third and fourth communication protocols when a rate of the received first information via any one of the first, second, third and fourth communication protocols is less than a first threshold.

3. The method of claim 2, wherein
the first communication protocol is Electronic Product Code (EPC) Generation 2 (Gen 2) Standard session 2A,
the second communication protocol is EPC Gen 2 Standard session 3A,
the third communication protocol is EPC Gen 2 Standard session 2B, and
the fourth communication protocol is EPC Gen 2 Standard session 3B.

4. The method of claim 1, further comprising
determining the at least one item associated with the third RFID tag is not positioned in the container and setting the third RFID tag from the second state to the first state when the second RFID reader receives the third information of the at least one item associated with the third RFID tag via the another communication protocol.

5. The method of claim 1, further comprising:
synchronizing each of the first RFID reader and the second RFID reader to receive fourth information of at least one item associated with a fourth RFID tag via the another communication protocol when the second RFID reader does not receive the second information of the first location associated with the second RFID tag;
determining the at least one item associated with the fourth RFID tag is positioned in the container when a signal strength of the first RFID reader is greater than a signal strength of the second RFID reader; and
determining the at least one item associated with the fourth RFID tag is not positioned in the container when the signal strength of the first RFID reader is less than the signal strength of the second RFID reader.

6. The method of claim 5, wherein the another communication protocol is Electronic Product Code (EPC) Generation 2 (Gen 2) Standard session 1A.

7. The method of claim 1, wherein the container is one of a storage unit affixed to or stored in a vehicle including a box affixed to a box truck, a trailer affixed to a platform having one or more sets of wheels and a hitch assembly for towing by the vehicle, and a unit loading device (ULD) stored in an aircraft, and a storage area integrated in at least a portion of a vehicle including a van and a sports utility vehicle (SUV).

8. The method of claim 1, wherein the first data is indicative of a velocity of the container, the first state of the container is indicative of the container being in motion, the second state of the container is indicative of the container being stationary, and the first location of the container is one of a warehouse, manufacturing facility, retail facility, and transit facility.

9. A system for item tracking, comprising, an accelerometer;

a first radio frequency identification (RFID) reader positioned in an interior of a container;

a second RFID reader positioned on an exterior of the container;

one or more processors; and a non-transitory computer-readable memory coupled to the accelerometer, the first RFID reader, the second RFID reader, and the one or more processors, the memory storing instructions thereon that, when executed by the one or more processors, cause the one or more processors to:

determine at least one of a first state and a second state of the container based on first data received from the accelerometer, the accelerometer being associated with the container;

responsive to determining the first state of the container, modify a communication protocol of the first RFID reader, receive, by the first RFID reader, first information of at least one item associated with a first RFID tag, and determine the at least one item associated with the first RFID tag is positioned in the container based on the first information;

responsive to determining the second state of the container, identify a first location of the container and modify at least one of the communication protocol of the first RFID reader and a communication protocol of the second RFID reader based on whether the second RFID reader receives second information of the first location associated with a second RFID tag, identify the first location of the container and receive, by the first RFID reader, third information of at least one item associated with a third RFID tag via another communication protocol when the second RFID reader receives the second information of the first location associated with the second RFID tag, determine whether the at least one item associated with the third RFID tag is positioned in the container based on the identified first location of the container and the third information, determine the at least one item associated with the third RFID tag is positioned in the container and set the third RFID tag from a first state to a second state when a number of instances of receiving the third information by the first RFID reader is greater than a second threshold, wherein the second state of the third RFID tag precludes the first RFID reader from receiving the third information.

10. The system of claim 9, wherein the instructions, when executed, further cause the one or more processors to:

receive, by the first RFID reader, the first information of the at least one item associated with the first RFID tag via one of a first communication protocol, a second communication protocol, a third communication protocol and a fourth communication protocol by switching between the first, second, third and fourth communication protocols when a rate of the received first information via any one of the first, second, third and fourth communication protocols is less than a first threshold.

11. The system of claim 10, wherein the first communication protocol is Electronic Product Code (EPC) Generation 2 (Gen 2) Standard session 2A, the second communication protocol is EPC Gen 2 Standard session 3A, the third communication protocol is EPC Gen 2 Standard session 2B, and the fourth communication protocol is EPC Gen 2 Standard session 3B.

12. The system of claim 9, wherein the instructions, when executed, further cause the one or more processors to:

determine the at least one item associated with the third RFID tag is not positioned in the container and set the third RFID tag from the second state to the first state when the second RFID reader receives the third information of the at least one item associated with the third RFID tag via the another communication protocol.

13. The system of claim 9, wherein the instructions, when executed, further cause the one or more processors to:

synchronize each of the first RFID reader and the second RFID reader to receive fourth information of at least one item associated with a fourth RFID tag via the another communication protocol when the second RFID reader does not receive the second information of the first location associated with the second RFID tag;

determining the at least one item associated with the fourth RFID tag is positioned in the container when a signal strength of the first RFID reader is greater than a signal strength of the second RFID reader; and determining the at least one item associated with the fourth RFID tag is not positioned in the container when the signal strength of the first RFID reader is less than the signal strength of the second RFID reader.

14. The system of claim 13, wherein the another communication protocol is Electronic Product Code (EPC) Generation 2 (Gen 2) Standard session 1A.

15. The system of claim 9, wherein the container is one of a storage unit affixed to or stored in a vehicle including a box affixed to a box truck, a trailer affixed to a platform having one or more sets of wheels and a hitch assembly for towing by the vehicle, and a unit loading device (ULD) stored in an aircraft, and a storage area integrated in at least a portion of a vehicle including a van and a sports utility vehicle (SUV).

16. The system of claim 9, wherein the first data is indicative of a velocity of the container, the first state of the container is indicative of the container being in motion, the second state of the container is indicative of the container being stationary, and the first location of the container is one of a warehouse, manufacturing facility, retail facility, and transit facility.

* * * * *